(12) United States Patent
Herold et al.

(10) Patent No.: US 8,997,710 B2
(45) Date of Patent: Apr. 7, 2015

(54) FUEL INJECTOR SUPPORT CONSTRUCTIONS FOR DIRECT INJECTION OPPOSED-PISTON ENGINES

(75) Inventors: Randy E. Herold, San Diego, CA (US); Brendan M. Lenski, West Bloomfield, MI (US); Fabien G. Redon, San Diego, CA (US)

(73) Assignee: Achates Power, Inc., San Diego, CA (US)

( * ) Notice: Subject to any disclaimer, the term of this patent is extended or adjusted under 35 U.S.C. 154(b) by 902 days.

(21) Appl. No.: 13/068,678

(22) Filed: May 16, 2011

(65) Prior Publication Data

US 2012/0080007 A1 Apr. 5, 2012

Related U.S. Application Data

(60) Provisional application No. 61/395,845, filed on May 18, 2010, provisional application No. 61/401,598, filed on Aug. 16, 2010.

(51) Int. Cl.
| | | |
|---|---|---|
| *F02B 3/00* | (2006.01) | |
| *F02B 25/08* | (2006.01) | |
| *F02B 23/06* | (2006.01) | |
| *F02B 75/28* | (2006.01) | |
| *F02F 1/18* | (2006.01) | |
| *F01B 7/14* | (2006.01) | |
| *F02B 7/02* | (2006.01) | |
| *F02D 41/30* | (2006.01) | |
| *F02M 61/14* | (2006.01) | |
| *F02B 75/02* | (2006.01) | |

(52) U.S. Cl.
CPC . *F02B 25/08* (2013.01); *F02B 7/02* (2013.01); *F02D 41/3094* (2013.01); *F02M 61/14* (2013.01); *F02B 23/0645* (2013.01); *F02B 75/28* (2013.01); *F02B 2075/025* (2013.01); *F02B 2275/14* (2013.01); *F02F 1/186* (2013.01); *Y02T 10/123* (2013.01); *F01B 7/14* (2013.01)

(58) Field of Classification Search
CPC ..... F02B 75/282; F02D 1/3094; F02M 61/14; F01B 7/02
USPC .......................................... 123/470
See application file for complete search history.

(56) References Cited

U.S. PATENT DOCUMENTS

| | | | | |
|---|---|---|---|---|
| 1,486,583 | A | * | 3/1924 | Huskisson ................. 123/51 B |
| 2,463,418 | A | * | 3/1949 | Pateras Pescara ............ 123/262 |
| 4,090,479 | A | * | 5/1978 | Kaye .............................. 123/306 |
| 4,858,579 | A | * | 8/1989 | Elsbett et al. .................. 123/299 |

(Continued)

FOREIGN PATENT DOCUMENTS

| | | | | |
|---|---|---|---|---|
| DE | 37 11 205 | A1 | 10/1988 | ............. F02B 75/26 |
| DE | 101 09 402 | A1 | 9/2002 | ............. F02D 41/10 |
| WO | 2011/146110 | A1 | 11/2011 | ............. F02B 23/06 |

OTHER PUBLICATIONS

International Search Report and Written Opinion for PCT/US2011/000863, mailed Aug. 12, 2011.

*Primary Examiner* — Hieu T Vo
*Assistant Examiner* — Arnold Castro
(74) *Attorney, Agent, or Firm* — Terrance A. Meador

(57) ABSTRACT

An opposed-piston internal combustion engine with one or more ported cylinders and uniflow scavenging includes fuel injectors supported at compound angles with respect to the cylinders in order to directly inject spray patterns of fuel in opposing directions through the side walls of the cylinders.

14 Claims, 4 Drawing Sheets

(56) References Cited

U.S. PATENT DOCUMENTS

| | | | |
|---|---|---|---|
| 4,872,433 A | 10/1989 | Paul et al. | 123/257 |
| 6,182,619 B1* | 2/2001 | Spitzer et al. | 123/51 B |
| 6,418,885 B1 | 7/2002 | Paul et al. | 123/25 C |
| 6,953,010 B1 | 10/2005 | Hofbauer | 123/46 R |
| 7,360,511 B2* | 4/2008 | Lemke et al. | 123/41.35 |
| 8,281,755 B2* | 10/2012 | Lemke et al. | 123/41.35 |
| 8,783,218 B2* | 7/2014 | Shen et al. | 123/51 R |
| 2007/0022983 A1* | 2/2007 | Reisser | 123/51 AA |
| 2008/0314688 A1* | 12/2008 | Lemke et al. | 184/6.8 |
| 2012/0285418 A1* | 11/2012 | Elsbett et al. | 123/300 |

* cited by examiner

FUEL INJECTOR SUPPORT CONSTRUCTIONS FOR DIRECT INJECTION OPPOSED-PISTON ENGINES

PRIORITY AND RELATED APPLICATIONS

This application claims priority to U.S. provisional application for patent No. 61/395,845 filed May 18, 2010, and to U.S. provisional application for patent No. 61/401,598 filed Aug. 16, 2010.

BACKGROUND

The field is internal combustion engines. Particularly, the field includes two-stroke, opposed-piston engines with ported cylinders in which fuel injectors are supported for direct fuel injection through the sidewalls of the cylinders. The support structure positions a fuel injector at a compound angle with respect to a cylinder in that its longitudinal axis is tilted at one angle with respect to a first plane that contains the longitudinal axes of all cylinder bores and is also tilted at another angle with respect to a plane that is orthogonal to the first plane and passes through diametrically opposed injector ports in each of the cylinders.

As seen in FIG. 1, an internal combustion engine is illustrated by way of an opposed-piston engine that includes at least one cylinder 10 with a bore 12 and longitudinally displaced exhaust and intake ports 14 and 16 machined or formed therein. The exhaust and intake ports 14 and 16 each include at least one circumferential array of openings in which adjacent openings are separated by a solid bridge. In some descriptions, each opening is referred to as a "port"; however, the construction of a circumferential array of such "ports" is no different than the port constructions shown and described herein. Fuel injector nozzles 17 are located in or adjacent to injector ports that open through the side of the cylinder, at or near the longitudinal center of the cylinder. Two pistons 20, 22 are disposed in the bore 12 with their end surfaces 20e, 22e in opposition to each other. For convenience, the piston 20 is referred as the "exhaust" piston because of its proximity to the exhaust port 14; and, the end of the cylinder wherein the exhaust port is formed is referred to as the "exhaust end". Similarly, the piston 22 is referred as the "intake" piston because of its proximity to the intake port 16, and the corresponding end of the cylinder is the "intake end".

Operation of an opposed-piston engine with one or more cylinders such as the cylinder 10 is well understood. In this regard, and with reference to FIG. 2, in response to combustion occurring between the end surfaces 20e, 22e the opposed pistons move away from respective top dead center (TDC) positions where they are at their closest positions relative to one another in the cylinder. While moving from TDC, the pistons keep their associated ports closed until they approach respective bottom dead center (BDC) positions in which they are farthest apart from each other. The pistons may move in phase so that the exhaust and intake ports 14, 16 open and close in unison. Alternatively, one piston may lead the other in phase, in which case the intake and exhaust ports have different opening and closing times.

In many opposed-piston constructions, a phase offset is introduced into the piston movements. For example, presume the exhaust piston leads the intake piston and the phase offset causes the pistons to move around their BDC positions in a sequence in which the exhaust port 14 opens as the exhaust piston 20 moves through BDC while the intake port 16 is still closed so that combustion gasses start to flow out of the exhaust port 14. As the pistons continue moving away from each other, the intake port 16 opens while the exhaust port 14 is still open and a charge of pressurized air ("charge air") is forced into the cylinder 10, driving exhaust gasses out of the exhaust port 14. The displacement of exhaust gas from the cylinder through the exhaust port 14 while charge air is admitted through the intake port 16 is referred to as "scavenging". Because the charge air entering the cylinder flows in the same direction as the outflow of exhaust gas (toward the exhaust port), the scavenging process is referred to as "uniflow scavenging".

As per FIG. 1, the pistons move through their BDC locations and reverse direction, the exhaust port 14 is closed by the exhaust piston 20 and scavenging ceases. The intake port 16 remains open while the intake piston 22 continues to move away from BDC. As the pistons continue moving toward TDC (FIG. 2), the intake port 16 is closed and the charge air in the cylinder is compressed between the end surfaces 20e and 22e. Typically, the charge air is swirled as it passes through the intake port 16 to promote good scavenging while the ports are open and, after the ports close, to mix the air with the injected fuel. Typically, the fuel is diesel which is injected into the cylinder by high pressure injectors. With reference to FIG. 1 as an example, the swirling air (or simply, "swirl") 30 has a generally helical motion that forms a vortex in the bore 12 which circulates around the longitudinal axis of the cylinder. As best seen in FIG. 2, as the pistons advance toward their respective TDC locations in the bore 12, fuel 40 is injected through the nozzles 17 directly into the swirling charge air 30 in the bore 12, between the end surfaces 20e, 22e of the pistons. The swirling mixture of charge air and fuel is compressed in a combustion chamber 32 defined between the end surfaces 20e and 22e when the pistons 20 and 22 are near their respective TDC locations. When the mixture reaches an ignition temperature, the fuel ignites in the combustion chamber, driving the pistons apart toward their respective BDC locations.

As illustrated in FIG. 2, fuel is directly injected through the side of the cylinder ("direct side injection") into the combustion chamber 32 and the movement of the fuel interacts with the residual swirling motion of the charge air in the combustion chamber. In some aspects of opposed piston engine construction with direct side injection, it is impractical to position the fuel injectors so that their axes are in diametrically opposing alignment. In this regard, physical constraints arising from an engine construction with multiple cylinders disposed in a row limit the space available for fuel injector placement.

SUMMARY

A solution to the problems described above is to provide direct side injection of fuel from different locations with respect to a cylinder bore.

In some aspects of this solution, at least two fuel injectors inject opposing spray patterns of fuel into the combustion chamber. In other aspects, at least two fuel injectors inject spray patterns of fuel into the combustion chamber from diametrically-opposed location.

Another solution to the problems described above is to position fuel injector nozzles for direct side injection of opposed spray patterns into a cylinder of a compactly configured opposed-piston engine. A first fuel injector with an injector nozzle is mounted beside the cylinder at a first compound angle with its nozzle at a first injection location and a second fuel injector with a nozzle is mounted beside the cylinder at a second compound angle with its nozzle at a second injection location diametrically opposite the first injection location.

DETAILED DESCRIPTION OF THE PREFERRED EMBODIMENTS

The constructions described in this specification are presented in an explanatory context that includes a ported, uniflow-scavenging engine having at least one cylinder in which a pair of pistons is disposed with their end surfaces in opposition. This explanatory context is intended to provide a basis for understanding various constructions by way of illustrative examples.

Figure 1:
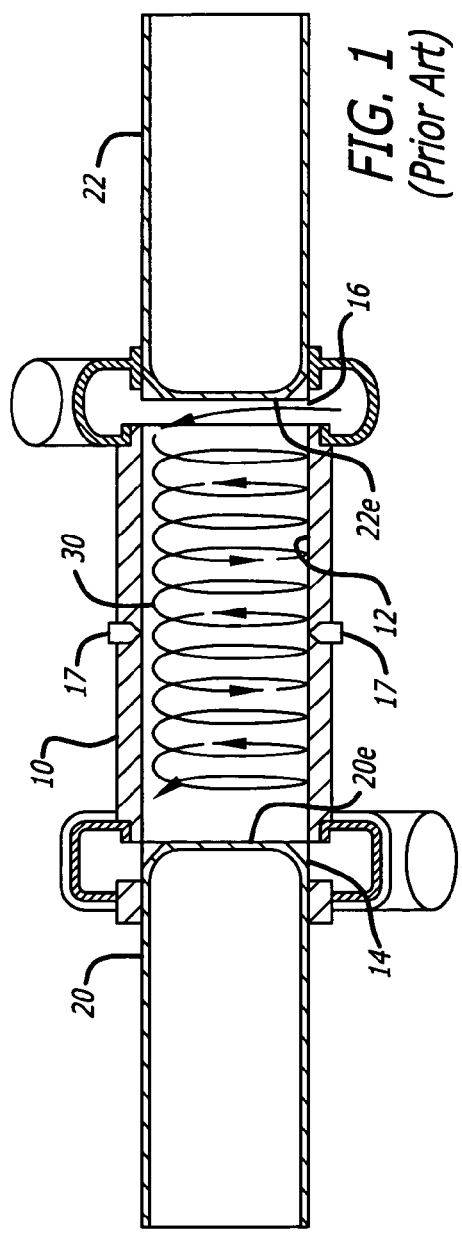
FIG. 1 is a side sectional, partially schematic, drawing of a cylinder of a prior art opposed-piston engine with opposed pistons near respective bottom dead center locations, and is appropriately labeled "Prior Art".
Figure 2:
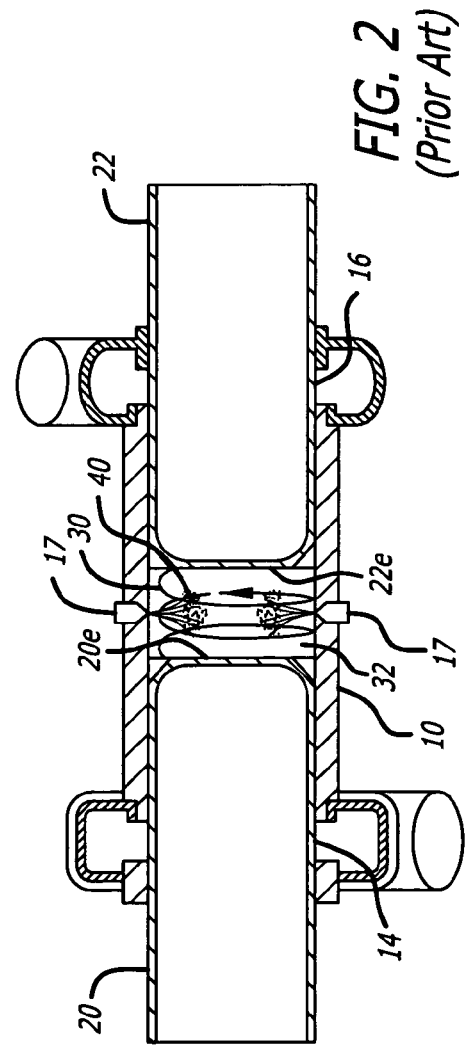
FIG. 2 is a side sectional, partially schematic, drawing of the cylinder of FIG. 1 with the opposed pistons near respective top dead center locations where end surfaces of the pistons define a combustion chamber, and is appropriately labeled "Prior Art".
Figure 3:
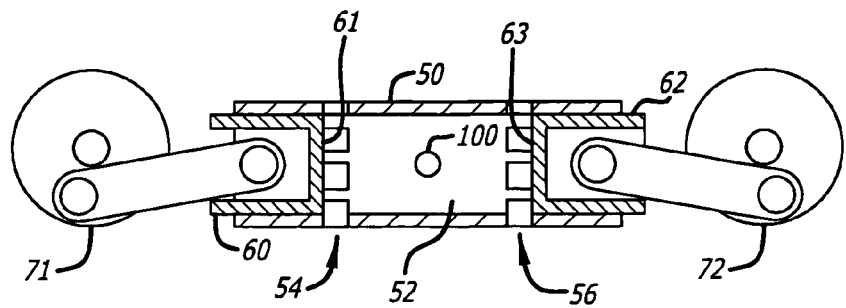
FIG. 3 is a side, sectional, partially schematic, diagram of a of an opposed-piston engine with two crankshafts.

A ported, uniflow-scavenging engine of the opposed-piston type includes at least one cylinder with longitudinally-separated exhaust and intake ports. Preferably, but not necessarily, the opposed-piston engine includes a plurality of cylinders aligned in a row with their exhaust ends on one side and their intake ends on the other side. A pair of pistons is disposed in opposition in the bore of each cylinder for opposed sliding movement therein. For example, with reference to FIG. 3, each of the cylinders 50 includes a bore 52 and exhaust and intake ports 54 and 56. An exhaust piston 60 is coupled by a connecting rod to a crankshaft 71 disposed at the exhaust ends of the cylinders 50, and an intake piston 62 is coupled by a connecting rod to a crankshaft 72 disposed at the intake ends of the cylinders 50. A combustion chamber is defined in the each bore 52, between the opposing end surfaces 61 and 63 of the pistons 60 and 62 disposed in the bore, when the pistons are near respective TDC positions. One or more injector ports are formed or machined in the side wall of each cylinder. Typically fuel is injected by a fuel injector with a nozzle positioned at an injector port 100 that opens through the wall at or near the longitudinal midpoint of each bore.

In respect of opposed-piston ("OP") engine construction and operation, Pirault and Flint have observed that side injection "as is necessary with an OP engine is probably also viewed as a major negative feature versus the conventional cylinder head central injection trend that allows symmetry of sprays and fuel-to-air mixing." [Pirault, J P and Flint, Martin, OPPOSED PISTON ENGINES: Evolution, Use, and Future Applications"; Warrendale, Pa.: SAE International, 2010, p. 6]. Accordingly, it is desirable to be able to position fuel injectors for directly injecting spray patterns of fuel into high pressure combustion space with strong charge air movement in order to obtain more uniform mixing of the charge air and fuel and thereby reduce emissions and increase fuel efficiency of these engines.

Combustion chamber constructions have been developed with shapes defined by contours in either or both of the piston end surfaces that induce motions in the charge air that produce more uniform fuel-to-air mixing in opposed-piston engines with direct side injection. A number of these combustion chamber constructions are described and illustrated in co-pending, commonly-owned U.S. patent application Ser. No. 13/066,589, filed Apr. 18, 2011. These combustion chambers are configured to promote interactions between squish flow and swirling charge air, which produce complex, turbulent charge air motions that result in better air/fuel mixing than is realized with swirl alone. Preferably, opposing spray patterns of fuel are injected into the complex air motions in such a combustion chamber. In some aspects, the opposing spray patterns are multi-plume patterns that meet at or near the center of the combustion chamber.

Figure 4:
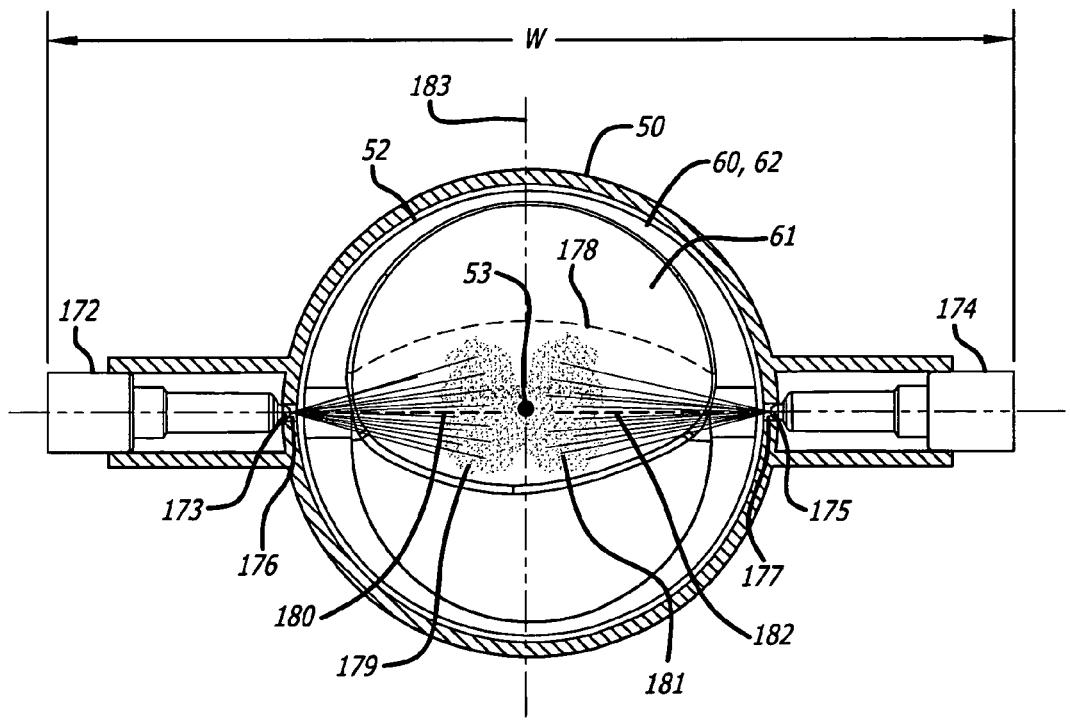
FIG. 4 is an explanatory diagram for describing opposing fuel injection patterns in combustion space of an internal combustion engine with diametrically opposed fuel injectors.

With reference to FIG. 4, the sectional view is at or near the longitudinal midpoint of the cylinder 50, looking directly into the bore 52 toward an end surface of one of the pistons 60, 62 disposed in the bore. A longitudinal axis of the bore is indicated by reference numeral 53. Fuel injectors 172 and 174 are mounted adjacent the side wall of the cylinder 50 with their longitudinal axes 180 and 182 in alignment with a diameter of the bore 52. The nozzle tips 173 and 175 of the fuel injectors are disposed in injector ports on opposite sides of the cylinder. Preferably, but not necessarily, the injector ports 176 and 177 are located in diametrically opposing positions with respect to the cylinder so that the injector nozzle tips 173 and 175 point at each other across the bore. Preferably, each injector nozzle tip has one or more holes through which fuel is injected through the injector port, into a combustion chamber 178 defined between the end surfaces of the pistons. Preferably, each tip sprays fuel in a diverging pattern that is aligned with the bore diameter and travels toward the axis 53. The fuel injectors are operated so that fuel spray patterns 179 and 181 are injected substantially simultaneously, at substantially the same pressure so as to travel toward and meet in the center of the bore 52. Preferably, but not necessarily, the spray pattern trajectories 180 and 182 are diametrically opposed with respect to the bore 52. Preferably, but not necessarily; the combustion chamber 178 has an elongate shape with a major axis that is collinear with the fuel injector axes 180 and 182.

In some aspects, it is impractical to position the fuel injectors in diametrically opposing alignment. In this regard, physical constraints arising from the engine construction may limit the space available for fuel injector layout. For example, presume an opposed-piston engine with a multiple-cylinder construction in which the cylinders are disposed in a parallel configuration with their longitudinal axes lying in a common plane. If an injection configuration producing diametrically opposed fuel spray patterns is desirable, and the pairs of opposing fuel injectors are disposed with their axes in the same plane as the cylinder axes, the cylinders must be spaced apart at least by the combined lengths of two fuel injectors. It is desirable to reduce such inter-cylinder spacing in order to make the engine more compact. Presume that the engine design includes the parallel array of cylinders and respective crankshafts disposed at the exhaust and intake ends of the cylinders. As per FIG. 4, rotation of a plane containing a pair of diametrically opposed fuel injectors so as to position the axes 180 and 181 of the fuel injectors 172 and 174 orthogonally to the plane 183 containing the cylinder axes 53 will permit closer inter-cylinder spacing. However, the width W of the engine is thereby increased, which compromises the engine's compactness. Accordingly, in an opposed-piston engine construction, it is desirable to position pairs of fuel injectors for injection of opposed spray patterns of fuel into the cylinders with minimal effect on the compactness of the engine.

Figure 5A:
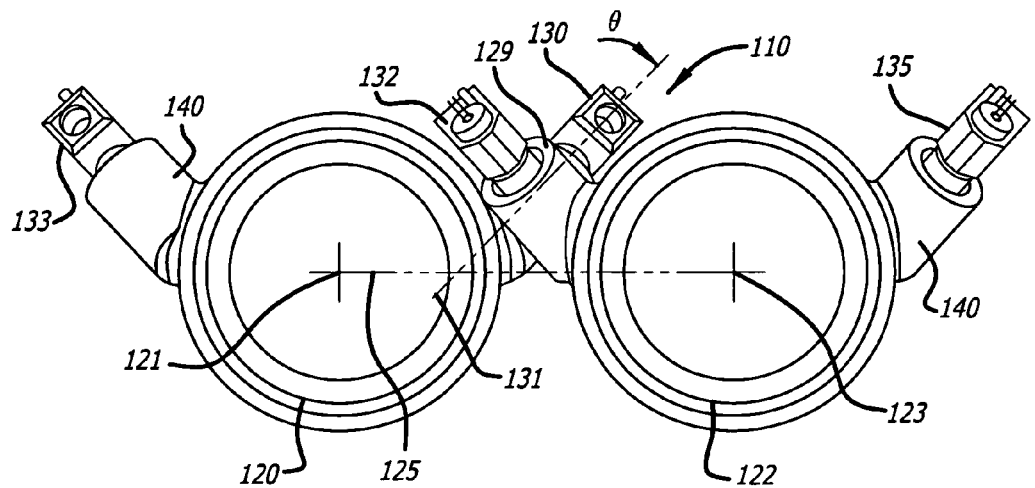
FIGS. 5A and 5B are explanatory diagrams for describing a fuel injection construction in an internal combustion engine, with fuel injector nozzle placement for effective fuel/air mixing and compact engine configuration.
Figure 5B:
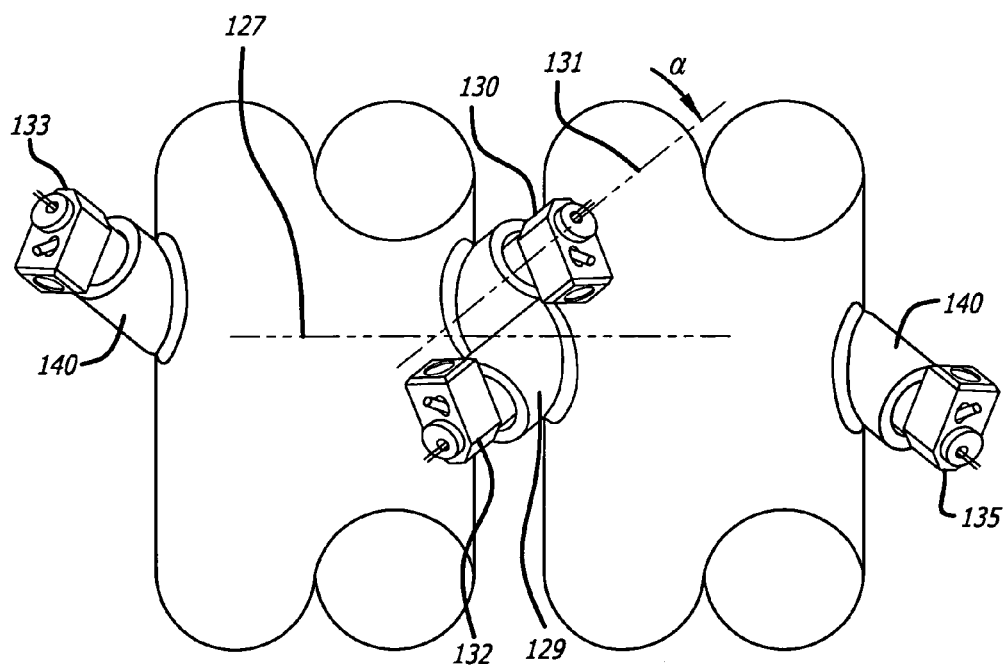

With reference to FIGS. 5A and 5B, a compact multi-cylinder opposed piston engine includes a cylinder support member 110 that supports a plurality of row-aligned cylinders. For the purpose of explanation, but without limiting the number of cylinders, the cylinder support member supports at least two cylinders 120 and 122 having bores with respective longitudinal axes 121 and 123. The cylinders supported by the cylinder support member 110 are arranged in a parallel array such that the longitudinal axes of all cylinder bores lie in a plane 125; preferably, the cylinders are aligned in a row. A plane 127 is orthogonal to the plane 125 and passes through diametrically-opposed injector ports in each of the cylinders. The cylinder support member 110 further includes injector support members which support single fuel injectors at the ends of the array and neighboring fuel injectors of adjacent cylinders. The injector support members dispose the fuel injectors that they support at respective compound angles with respect to the cylinders. Each compound angle includes a first angle portion defined between the plane 125 and the longitudinal axis of a fuel injector and a second angle portion defined between the plane 127 and the longitudinal axis. The compound angle disposes the fuel injector with respect to a cylinder bore that maintains the fuel injector in a position for injecting a fuel spray pattern into the bore in diametric alignment with an opposing fuel spray pattern. The compound angle further disposes the fuel injector for minimizing the distance between itself and a neighboring fuel injector.

For example, with reference to FIGS. 5A and 5B, the injector support member 129 includes a boss that supports the fuel injector 130, which is positioned to inject fuel through a port into the bore of the cylinder 120, and another boss that supports the fuel injector 132, which is positioned to inject fuel through a port into the bore of the cylinder 122. Each of the fuel injectors 130 and 132 is supported by its boss in such a manner that its longitudinal axis is disposed at a respective compound angle. In this regard, the compound angle of the fuel injector 130 has a first portion, the angle θ defined between the fuel injector's longitudinal axis 131 and the plane 125, and a second portion, the angle α defined between the longitudinal axis 131 and the plane 127. As is apparent from FIGS. 5A and 5B, the distance between the longitudinal axes of the cylinder bores 121 and 123 with the neighboring fuel injectors 130 and 132 disposed at respective compound angles is less than the distance that would result if their longitudinal axes were disposed in diametric alignment with the cylinder bores and in the plane 127. The cylinder support member 110 also includes injector support members 140, each of which receives a single fuel injector having no neighboring fuel injector and supports that fuel injector at a compound angle. Thus, per FIGS. 5A and 5B, the left injector support member 140 has received a single fuel injector 133, and the right injector support member has received a single fuel injector 135. In other words, a single-boss injector support member 140 is positioned on the outboard side of each of the two cylinders at the ends of a parallel configuration of two or more cylinders.

Figure 6:
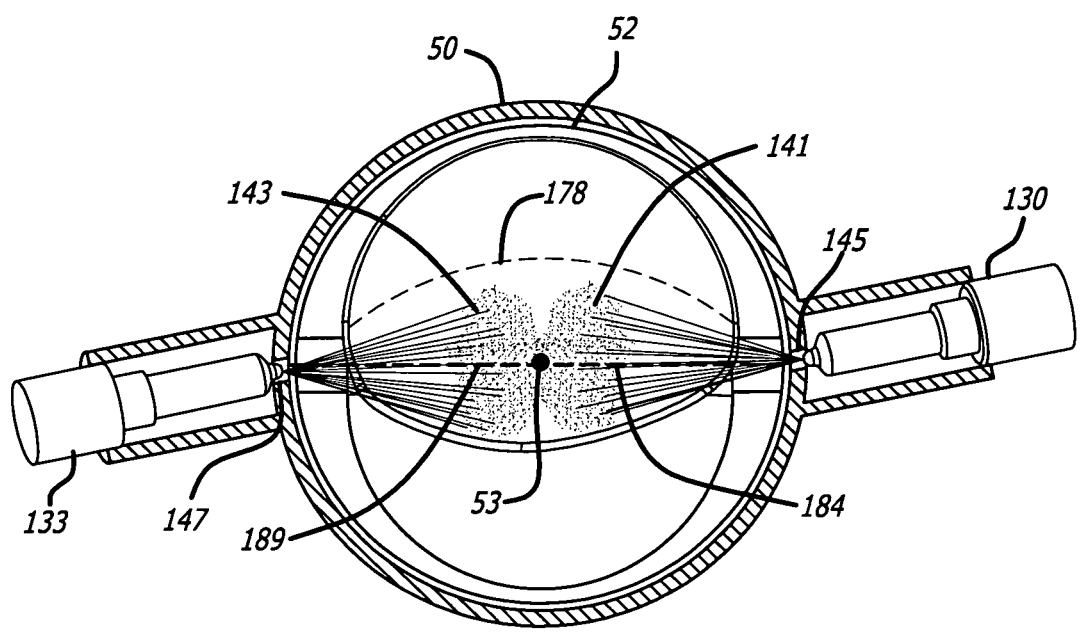
FIG. 6 is an explanatory diagram for describing opposing fuel injection patterns in combustion space of an internal combustion engine with fuel injectors disposed at compound angles.

As best seen in FIGS. 5A and 5B, since each fuel injector is supported at a compound angle, its longitudinal axis is not co-linear with a diametrical direction of a cylinder bore. However, the nozzle tip of each fuel injector is disposed in an injector port that is diametrically opposed to another injector port in the same cylinder. Supported in this manner, each fuel injector is preferably fitted with a nozzle tip configured to cause a spray pattern of fuel to be injected through a first injector port into a cylinder bore in a direction diametrical to the cylinder bore and directed toward a second injector port diametrically opposite the first injector port. Thus, with reference to FIG. 6, the fuel injectors 130 and 133 are each disposed at a respective compound angle with respect to the cylinder 50; and, each includes a nozzle tip (145 and 147, respectively) configured to cause a spray pattern of fuel to be injected along the major axis 184 of the elongated combustion chamber 178. During operation of the opposed-piston engine, the fuel injectors 130, 133 inject spray patterns 141 and 143 into the cylinder bore 52 through diametrically opposed injector ports 145 and 147. The fuel injectors are operated so that spray patterns 141 and 143 are injected substantially simultaneously so as to travel toward the center of the bore 52. The spray patterns 141 and 143 travel toward each other, along the combustion chamber major axis 184, which is aligned with the diameter of the bore 52 with which the injector ports 145 and 147 are aligned.

The pistons and associated cylinder constructions are manufactured by casting and/or machining metal materials. For example, each of the pistons may be constituted of a skirt assembled to a crown on which a piston end surface is formed. The crown may comprise a high carbon steel such as 41-40 or 43-40, and the skirt may be formed using 4032-T651 aluminum. In such cases, the cylinders and associated support members preferably comprise an integrated construction of cast iron composition. The fuel injectors preferably comprise electronic, high pressure devices designed for operation with diesel fuel. Depending on the construction of the cylinders, support members, and injector support members, the fuel injectors can be retained at their compound angles by clamping and/or threading them in the injector support members, or by other equivalent retaining mechanisms.

Although the fuel injector support constructions described herein are illustrated with reference to a ported, opposed-piston engine construction with two crankshafts, it should be understood that any one or more of these constructions can be applied to opposed-piston engines with one or more crankshafts. Moreover, various aspects of these constructions can be applied to opposed-piston engines with cylinders disposed in opposition. Accordingly, the scope of patent protection to be afforded to these constructions is limited only by the following claims.

We claim:

1. An internal combustion engine including a plurality of cylinders, each cylinder including longitudinally separated exhaust and intake ports and a pair of pistons disposed in opposition to one another in a bore of the cylinder, in which, for each cylinder, a first fuel injector with an injector nozzle positioned near the longitudinal center of the cylinder is supported at a first compound angle with its nozzle at a first injection location, a second fuel injector with an injector nozzle positioned near the longitudinal center of the cylinder is supported at a second compound angle with its nozzle at a second injection location diametrically opposite the first injection location.

2. The internal combustion engine of claim 1, in which the plurality of cylinders is disposed in a row such that the longitudinal axes of the cylinders are in a first plane and each cylinder includes first and second diametrically opposed injector ports positioned near the longitudinal center such that a second plane orthogonal to the first plane passes through the injector ports in all of the cylinders, wherein, for each cylinder, the injector nozzle of the first fuel injector is positioned at the first injector port, and the injector nozzle of the second fuel injector is positioned at the second injection port.

3. The internal combustion engine of claim 2, in which each compound angle includes a first angle portion defined between the first plane and the longitudinal axis of a fuel injector and a second angle portion defined between the second plane and the longitudinal axis of the fuel injector.

4. The internal combustion engine of claim 1, in which the plurality of cylinders is disposed in a row such that the longitudinal axes of the cylinders are in a first plane and each cylinder includes first and second diametrically opposed injector ports positioned near the longitudinal center such that a second plane orthogonal to the first plane passes through the injector ports in all of the cylinders, wherein, each compound angle includes a first angle portion defined between the first plane and the longitudinal axis of a fuel injector and a second angle portion defined between the second plane and the longitudinal axis of the fuel injector.

5. An opposed-piston engine including a plurality of row-aligned cylinders with longitudinally-separated exhaust and intake ports, two crankshafts, one disposed at each end of the cylinders, and a pair of pistons disposed in opposition to one another in a bore of each cylinder, wherein the pistons in exhaust ends of the cylinders are coupled to a first crankshaft and the pistons in intake ends of the cylinders are coupled to a second crankshaft, and in which for each cylinder:
   a first fuel injector with a nozzle is supported at a position near the longitudinal center of the cylinder at a first compound angle with its nozzle at a first injection location; and
   a second fuel injector with nozzle is supported near the longitudinal center of the cylinder at a second compound angle with its nozzle at a second injection location.

6. The opposed-piston engine of claim 5, in which the plurality of cylinders is disposed in a row such that the longitudinal axes of the cylinders are in a first plane and each cylinder includes first and second diametrically opposed injector ports positioned near the longitudinal center such that a second plane orthogonal to the first plane passes through the injector ports in all of the cylinders, wherein, for each cylinder, the nozzle of the first fuel injector is positioned at the first injector port, and the nozzle of the second fuel injector is positioned at the second injection port.

7. The opposed-piston engine of claim 6, in which each compound angle includes a first angle portion defined between the first plane and the longitudinal axis of a fuel injector and a second angle portion defined between the second plane and the longitudinal axis of the fuel injector.

8. The opposed-piston engine of claim 5, in which the plurality of cylinders is disposed in a row such that the longitudinal axes of the cylinders are in a first plane and each cylinder includes first and second diametrically opposed injector ports positioned near the longitudinal center such that a second plane orthogonal to the first plane passes through the injector ports in all of the cylinders, wherein, each compound angle includes a first angle portion defined between the first plane and the longitudinal axis of a fuel injector and a second angle portion defined between the second plane and the longitudinal axis of the fuel injector.

9. An opposed-piston engine, comprising:
   a support member supporting a plurality of row-aligned cylinders with longitudinally-separated exhaust and intake ports;
   a pair of pistons disposed in opposition to one another in a bore of each cylinder;
   at least one a first fuel injector supported at a position near the longitudinal center of a first cylinder at a first compound angle with its nozzle at a first injection location; and
   a second fuel injector supported near the longitudinal center of the first cylinder at a second compound angle with its nozzle at a second injection location.

10. The opposed-piston engine of claim 9, in which the plurality of cylinders is disposed in a row such that the longitudinal axes of the cylinders are in a first plane and each cylinder includes first and second diametrically opposed injector ports positioned near the longitudinal centers of the cylinders such that a second plane orthogonal to the first plane passes through the injector ports in all of the cylinders, wherein, for each cylinder, the injector nozzle of the first fuel injector is positioned at the first injector port, and the nozzle of the second fuel injector is positioned at the second injection port.

11. The opposed-piston engine of claim 10, in which each compound angle includes a first angle portion defined between the first plane and the longitudinal axis of a fuel injector and a second angle portion defined between the second plane and the longitudinal axis of the fuel injector.

12. The opposed-piston engine of claim 9, in which the plurality of cylinders is disposed in a row such that the longitudinal axes of the cylinders are in a first plane and each cylinder includes first and second diametrically opposed injector ports positioned near the longitudinal center such that a second plane orthogonal to the first plane passes through the injector ports in all of the cylinders, wherein, each compound angle includes a first angle portion defined between the first plane and the longitudinal axis of a fuel injector and a second angle portion defined between the second plane and the longitudinal axis of the fuel injector.

13. The opposed-piston engine of claim 9, in which the support member includes an injector support member supporting the first fuel injector at the first compound angle with respect to the first cylinder and supporting a third fuel injector of a neighboring cylinder of the first cylinder at a third compound angle with respect to the neighboring cylinder.

14. The opposed-piston engine of claim 13, in which the second and third compound angles are equal.

* * * * *